United States Patent
Grosser, Jr.

(10) Patent No.: US 9,008,091 B1
(45) Date of Patent: Apr. 14, 2015

(54) METHODS, SYSTEMS, AND COMPUTER READABLE MEDIA FOR IMPROVED MULTICAST SCALING THROUGH POLICY BASED REDIRECTION

(75) Inventor: Donald B. Grosser, Jr., Apex, NC (US)

(73) Assignee: Extreme Networks, Inc., Santa Clara, CA (US)

( * ) Notice: Subject to any disclaimer, the term of this patent is extended or adjusted under 35 U.S.C. 154(b) by 712 days.

(21) Appl. No.: 12/973,417

(22) Filed: Dec. 20, 2010

Related U.S. Application Data

(60) Provisional application No. 61/415,662, filed on Nov. 19, 2010.

(51) Int. Cl.
H04L 12/56 (2006.01)
H04L 12/701 (2013.01)

(52) U.S. Cl.
CPC ..................... H04L 45/00 (2013.01)

(58) Field of Classification Search
CPC ............................ H04L 45/00; H04L 29/0653
USPC .................. 370/390, 352, 235, 389, 392, 401
See application file for complete search history.

(56) References Cited

U.S. PATENT DOCUMENTS

| | | | |
|---|---|---|---|
| 5,513,335 A | 4/1996 | McClure | |
| 5,574,860 A | 11/1996 | Perlman et al. | |
| 5,602,841 A | 2/1997 | Lebizay et al. | |
| 5,959,968 A | 9/1999 | Chin et al. | |
| 6,272,133 B1 | 8/2001 | Bialkowski et al. | |
| 6,370,142 B1 | 4/2002 | Pitcher et al. | |
| 6,614,787 B1 | 9/2003 | Jain et al. | |
| 6,711,163 B1 | 3/2004 | Reid et al. | |
| 6,771,673 B1 | 8/2004 | Baum et al. | |
| 6,898,189 B1 | 5/2005 | Di Benedetto et al. | |
| 6,950,431 B1 | 9/2005 | Nozaki et al. | |
| 6,977,891 B1 | 12/2005 | Ranjan et al. | |
| 7,283,525 B2 | 10/2007 | Burgess et al. | |
| 7,304,996 B1 | 12/2007 | Swenson et al. | |
| 7,443,852 B2 | 10/2008 | Kwon et al. | |
| 7,480,295 B2 | 1/2009 | Sung et al. | |
| 7,590,120 B2 | 9/2009 | Shuen et al. | |
| 7,646,773 B2 | 1/2010 | Na et al. | |
| 7,949,662 B2 | 5/2011 | Farber et al. | |
| 7,983,262 B1 * | 7/2011 | Bishara .......................... | 370/390 |
| 8,208,418 B1 | 6/2012 | Grosser, Jr. et al. | |
| 2002/0009083 A1 | 1/2002 | Ambe et al. | |

(Continued)

OTHER PUBLICATIONS

Non-Final Official Action for U.S. Appl. No. 12/355,756 (Jul. 20, 2011).

(Continued)

*Primary Examiner* — Dang Ton
*Assistant Examiner* — Mandish Randhawa
(74) *Attorney, Agent, or Firm* — Jenkins, Wilson, Taylor & Hunt, P.A.

(57) ABSTRACT

Methods, systems, and computer readable media for improved multicast scaling through policy based redirection are disclosed. According to one method, a packet belonging to an Internet protocol multicast (IPMC) stream is received, where the packet includes packet routing information. A lookup is performed in a IPMC forwarding database (FDB) and, in response to failing to locate an entry in the IPMC FDB, an attempt is made to insert the packet routing information in the IPMC FDB. In response to failing to insert the packet routing information in the IPMC FDB, a packet redirection rule is created based on the packet forwarding information.

9 Claims, 3 Drawing Sheets

(56) References Cited

U.S. PATENT DOCUMENTS

| | | |
|---|---|---|
| 2002/0099857 A1 | 7/2002 | Lowe et al. |
| 2005/0041680 A1 | 2/2005 | Tanaka et al. |
| 2005/0083839 A1 | 4/2005 | Singh et al. |
| 2005/0182841 A1* | 8/2005 | Sharp .......................... 709/228 |
| 2006/0050717 A1 | 3/2006 | Lepakshaiah et al. |
| 2006/0056427 A1 | 3/2006 | Sato |
| 2007/0038743 A1 | 2/2007 | Hellhake et al. |
| 2007/0043695 A1 | 2/2007 | Bare et al. |
| 2007/0127459 A1 | 6/2007 | Lo et al. |
| 2007/0195793 A1 | 8/2007 | Grosser et al. |
| 2009/0147786 A1* | 6/2009 | Li et al. .......................... 370/390 |
| 2011/0161580 A1* | 6/2011 | Shah et al. .................... 711/108 |

OTHER PUBLICATIONS

Advisory Action for U.S. Appl. No. 12/355,756 (Jun. 10, 2011).
Final Official Action for U.S. Appl. No. 12/355,756 (Feb. 15, 2011).
Official Action for U.S. Appl. No. 12/355,756 (Jul. 23, 2010).
"Summit® X480 Series," Extreme Networks Data Sheet, pp. 1-16 (Copyright 2010).
Co-pending U.S. Appl. No. 12/335,756, filed Jan. 16, 2009.
"Summit® X450 Series," Extreme Networks Data Sheet, pp. 1-10 (Copyright 2007).
Albanna et al., "IANA Guidelines for IPv4 Multicast Address Assignments," Network Working Group RFC 3171 (Aug. 2001).
Notice of Allowance and Fee(s) Due for U.S. Appl. No. 12/355,756 (Mar. 5, 2012).

* cited by examiner

METHODS, SYSTEMS, AND COMPUTER READABLE MEDIA FOR IMPROVED MULTICAST SCALING THROUGH POLICY BASED REDIRECTION

PRIORITY CLAIM

This application claims the benefit of U.S. Provisional Patent Application Ser. No. 61/415,662 filed Nov. 19, 2010; the disclosure of which is incorporated herein by reference in its entirety.

TECHNICAL FIELD

The subject matter described herein relates to multicast scaling. More specifically, the subject matter relates to methods, systems, and computer readable media for improved multicast scaling through policy redirection.

BACKGROUND

Internet Protocol (IP) multicast is a method of sending IP datagrams to a group of interested receivers in a single transmission. IP multicast is a technique for one-to-many and many-to-many real-time communication over an IP infrastructure in a network. It is often employed for streaming media applications on the Internet and private networks. IP multicast uses specially reserved multicast address blocks in IPv4 and IPv6. In IPv6, IP multicast addressing replaces broadcast addressing as implemented in IPv4. In contrast to unicast, multicast only requires that the source send a packet once and that other nodes in the network replicate the packet to reach multiple receivers.

One problem associated with conventional IP multicasting is that packet forwarding devices do not proportionally scale for IP multicast forwarding entries. Specifically, while several vendor silicon solutions allow external lookup tables to house very large layer-2 MAC, IPv4+IPv6 route, and access control databases, not all allow IP multicast forwarding database extension. As the demand for improved IP multicast scaling has increased in recent years due to the adoption of multicast is use cases such as IPTV and finance-driven applications, so too has the demand for improved multicast scaling. In networks where a large number of hosts send multicast traffic to the same multicast destinations, FDB resources may become a bottleneck. As a result, subsequent FDB entries cannot be added (i.e., insertion failure). When FDB entry insertion failure occurs, CPU slowpath processing may be performed. However, because it is desirable for layer 3 forwarding devices to perform multicast forwarding quickly, it is desirable to limit the amount of slowpath processing performed. Even with advanced hashing algorithms, it is possible to hit hash bucket collisions, resulting in insertion failures, long before the entries in the IPMC FDB are consumed. For example, real-world environments often demonstrate hash bucket collisions at approximately 75% IPMC FDB table utilization.

Accordingly, in light of these difficulties, a need exists for improved methods, systems, and computer readable media for improved multicast scaling.

SUMMARY

Methods, systems, and computer readable media for improved multicast scaling through policy based redirection are disclosed. According to one method, a packet belonging to an Internet protocol multicast (IPMC) stream is received, where the packet includes packet routing information. A lookup is performed in a IPMC forwarding database (FDB) and, in response to failing to locate an entry in the IPMC FDB, an attempt is made to insert the packet routing information in the IPMC FDB. In response to failing to insert the packet routing information in the IPMC FDB, a packet redirection rule is created based on the packet forwarding information.

A packet forwarding device for improved multicast scaling through policy based redirection is also disclosed. The packet forwarding device includes an input/output (I/O) module configured to receive an IP multicast stream and an Internet protocol multicast (IPMC) egress port data structure configured to store packet routing information for the IP multicast stream. An IPMC forwarding database (FDB) is configured to store entries containing information associated with the IP multicast stream. A policy-based redirection (PBR) access control rule (ACR) data structure is configured to store entries containing information associated with IP multicast streams. An intelligent IPMC scaling module is configured to perform a lookup in the IPMC FDB and, in response to failing to locate an entry in the IPMC FDB, attempting to insert the packet routing information in the IPMC FDB. In response to failing to insert the packet routing information in the IPMC FDB, the intelligent IPMC scaling module creates a packet redirection rule based on the packet forwarding information.

The subject matter described herein for improved multicast scaling through policy based redirection may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

The subject matter described herein will now be explained with reference to the accompanying drawings of which.

DETAILED DESCRIPTION

According to one aspect of the subject matter described herein, a method for improved multicast scaling through policy based redirection is disclosed. The method begins by attempting to insert packet routing information in an Internet protocol multicast (IPMC) forwarding database (FDB). If the packet routing information cannot be inserted in the IPMC FDB (i.e., insertion failure), a policy-based redirection (PBR)

access control rule (ACR) may be created and added to a separate PBR ACR data structure. The IP multicast stream may then be redirected to an IPMC egress port data structure using the PBR ACR in the PBR ACR data structure and the IP multicast stream may be forwarded to its next hop destination using the IPMC egress port data structure. Therefore, instead of performing slowpath processing when IPMC information cannot be added to the native IPMC FDB, according to the subject matter described herein, an entry may be added as a PBR rule when an insertion failure occurs. With this method, the IP multicast scale of the system can be greatly increased.

Figure 1:
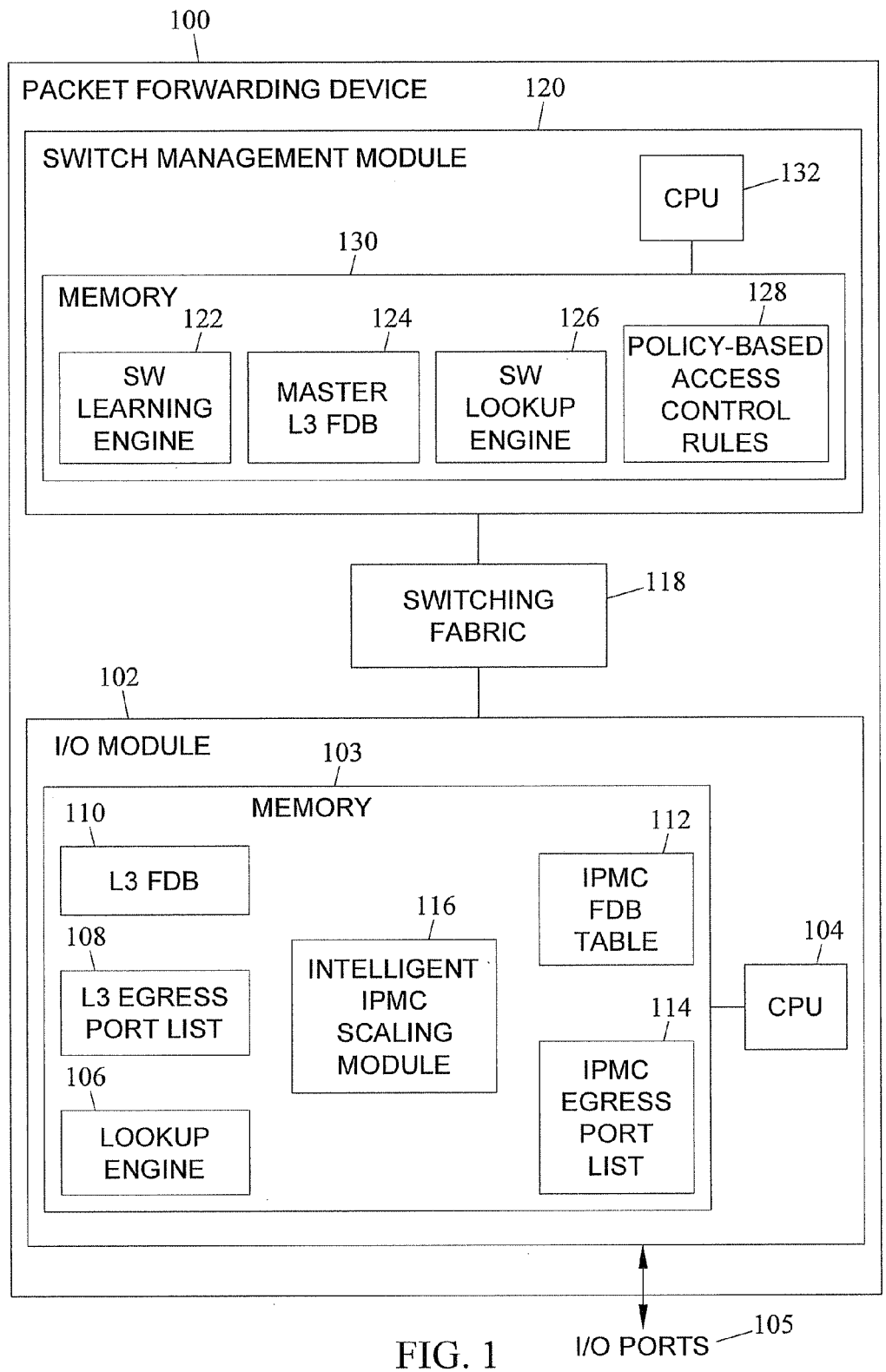
FIG. 1 is a block diagram illustrating components of an exemplary packet forwarding device suitable for implementing improved multicast scaling through policy redirection according to an embodiment of the subject matter described herein.

FIG. 1 is a block diagram illustrating exemplary components of a packet forwarding device suitable for implementing improved multicast scaling through policy redirection according to an embodiment of the subject matter described herein. It is appreciated that while the packet forwarding device shown in FIG. 1 represents one possible implementation of a forwarding device suitable for implementing improved multicast scaling through policy redirection, the subject matter described herein can be implemented on other forwarding devices. Examples of a commercially available layer 2 or layer 3 packet forwarding devices suitable for use with embodiments of the subject matter described herein include the Summit® X480 series and BD8K "xl-series" switches available from Extreme Networks of Santa Clara, Calif.

Referring to FIG. 1, packet forwarding device (e.g., layer 2 switch or layer 3 router) 100 may forward multicast packets using FDBs and port list data structures implemented in hardware and software. For example, packet forwarding device 100 may include a plurality of input/output (I/O) modules 102 for sending and receiving multicast packets. I/O modules 102 may include a computer-readable medium, such as memory 103, for storing instructions that, when executed by CPU 104, perform steps as described in greater detail below with respect to functional elements 106-116. I/O modules 102 may each include one or more I/O ports 105 for connecting to an external network. In order to perform layer 2 or layer 3 multicast packet forwarding, each I/O module 102 may include a lookup engine 106, a port list data structure 108, and a layer 3 multicast forwarding database 110. Port list data structure 108 includes a plurality of port (or vport) identifiers. Layer 3 forwarding database 110 includes a table of source IP addresses and/or VLAN identifiers. Lookup engine 106 performs lookups in forwarding database 110 based on multicast group addresses and source addresses and/or VLAN identifiers to determine a matching port list in egress port list data structure 108 to determine where to forward each received packet. Although a single lookup engine 106 is depicted in FIG. 1 for performing layer 3 multicast forwarding lookups, the subject matter described herein is not limited to such an implementation. In an alternate implementation, layer 3 lookup engine 106 may be implemented using separate hardware, software, or firmware components.

IPMC FDB 112 holds the port membership information for all active multicast address entries. The key for an entry may consist of a VLAN ID and MAC address pair. It is appreciated that entries in IPMC FDB 112 may contain data for more than one protocol. Thus, IPMC FDB table 112 may include any suitable data structure for storing IP multicast entries containing packet forwarding information for IP multicast packet streams. As will be described in greater detail below with respect to FIG. 3, entries in IPMC FDB table 112 may include a source IP address, group IP address, and VLAN ID associated with a hash bucket and a hash entry. For example, in one embodiment, the IPMC FDB table 112 may include an 8,000-entry (internal chip) hash table comprised of 1,000 hash buckets of 8 entries each. The result of a lookup in IPMC FDB table 112 may include a pointer to an entry in egress IPMC port list 112. Therefore, if a matching entry is found for a given IPMC stream in IPMC FDB table 112, the IPMC stream may be forwarded to its next hop destination using the egress port information (e.g., vports) indicated in IPMC egress port list 114.

In order to perform multicast forwarding, conventional layer 2 and layer 3 forwarding devices typically include a forwarding database (FDB) and an egress port list data structure whose entries are associated. For example, each FDB entry typically contains the source IP address of the sender and the group IP addresses for each learned multicast group. FDB entries may also include VLAN identifiers for specifying a VLAN, may only include the group identifier, or may include combinations of the above information. The port list data structure typically includes a plurality of port lists that include a list of outgoing port identifiers indicating the ports to which a received multicast packet should be forwarded. Port lists may also include VLAN identifiers in addition to port identifiers.

As in conventional layer 2 and layer 3 multicast forwarding devices, the subject matter described herein may implement IPMC FDB table 112 and IPMC egress port list 114 using independent hardware structures/resources. For example, IPMC egress port list 114 may be stored in a first memory and IPMC FDB table 112 may be stored in a second memory, where entries in IPMC FDB table 112 include pointers to memory locations in IPMC egress port list 114.

IPMC egress port list 114 may include a data structure for storing one or more entries, where each entry contains an egress port list identifier that is associated with a vport used for indicating next hop information for forwarding IP multicast packets. As used herein, the term "vport" refers to a combination of a VLAN identifier and a port identifier. A vport may be written as <vlan>, <port> or as <vlan>/<port>. One or more entries (i.e., port lists) in IPMC FDB 112 may be associated with each entry in IPMC egress port list 114. Thus, referring to FIG. 3, a lookup performed for IP multicast stream <sourceIP=10.66.7.2, groupIP=224.1.1.1, VlanId=100> would result in egress port list 1 corresponding to VLAN 100/port 1. Using a similar process, a lookup performed for either IP multicast stream <sourceIP=10.0.0.1, groupIP=224.1.1.1, VlanId=100> or <sourceIP=10.66.5.2, groupIP=239.1.3.3, VlanId=100> would both result in egress port list 0 corresponding to VLAN 2/port 1+VLAN 3/port 1.

Returning to FIG. 1, intelligent IPMC scaling module 116 may be configured to attempt insertion of entries in IPMC FDB 112 and to detect a failure to insert the entry. In response to detecting a failure to insert the entry, intelligent IPMC scaling module 116 may be configured to create and install a policy based access control rule with a redirection modifier in policy-based access control rules 128. The IP multicast stream (as well as subsequent IP multicast streams) may then be redirected to IPMC egress port data structure 114 and forwarded to a next hop destination.

Switching fabric 118 switches packets between I/O module(s) 102 and switch management module 120. Switch management module 120 may include layer 3 software learning engine 122, a master layer 3 forwarding database 124, a software lookup engine 126, and a policy-based access control rules 128, which may be stored in memory 130 and executed by CPU 132.

Learning engine 122 may include routing protocol software for exchanging routing protocol information with other nodes. Therefore, learning engine 122 may add learned entries to master software FDB 124. Master layer 3 forwarding database 124 may include a copy of all of the entries in hardware-based layer 3 forwarding databases 110 maintained by I/O modules 102 as well as any additional entries learned using layer 3 routing protocols and/or Internet group management protocol (IGMP)/protocol independent multicast (PIM) snooping and/or multicast listener discovery (MLD) snooping implemented by software learning engine 122. Software lookup engine 126 may perform lookups in master layer 3 forwarding database 124 for packets received by I/O modules 102 that cannot be forwarded using the layer 3 forwarding data maintained locally by each I/O module ("slowpath" processing).

Policy based redirection (PBR) access control rules 128 may be a data structure, such as a table, for storing PBR rules. PBR ACR 128 may be implemented using an external ternary content addressable memory (TCAM) or other suitable memory that is logically separate from IPMC FDB 112 and IPMC egress port list 114. Policy based redirection is a widely implemented and deployed orthogonal feature which allows users to override the layer 3 forwarding decision for a specific access-control and instead forward matching packets to an alternate next-hop. However, according to the subject matter described herein, the tools of policy based redirection may be leveraged in a new way (e.g., automatically creating a rule once IPMC FDB resources are full) to improve multicast scalability in packet forwarding devices.

Policy-based routing provides a mechanism for expressing and implementing forwarding/routing of data packets based on the policies defined by the network administrators. It provides a more flexible mechanism for routing packets through routers, complementing the existing mechanism provided by routing protocols. Instead of routing by the destination address, policy-based routing allows network administrators to determine and implement routing policies to allow or deny paths based on criteria such as: the identity of a particular end system, application, protocol, or the size of packets. Thus, policy-based routing is a technique used to make routing decisions based on policies set by the network administrator and/or in combination with the size of the packet, the protocol of the payload, or other information available in a packet header or payload. Based on the packet information retrieved, "policy based management" can be applied. Included in policy based management is "policy based redirection" (redirects traffic to alternate carriers, routers, or appliances), "policy based routing" (directs traffic to traverse specific, static paths, typically in one hop and the data is encapsulated) and "policy based handling" (directs special treatment for a data packet). Policy based management can be applied to a single host-to-host transmission, or encompass all the transmissions in the network.

A typical implementation of Layer 4 switching function is to assign different priorities to different applications. For example, using a Layer 4 switch, an administrator can assign a different priority to e-mail applications than database applications as a "policy". As mentioned above, the subject matter described herein leverages the tools of policy based redirection may be leveraged in a new way (e.g., automatically creating a rule once IPMC FDB resources are full) to improve multicast scalability in packet forwarding devices.

Figure 2:
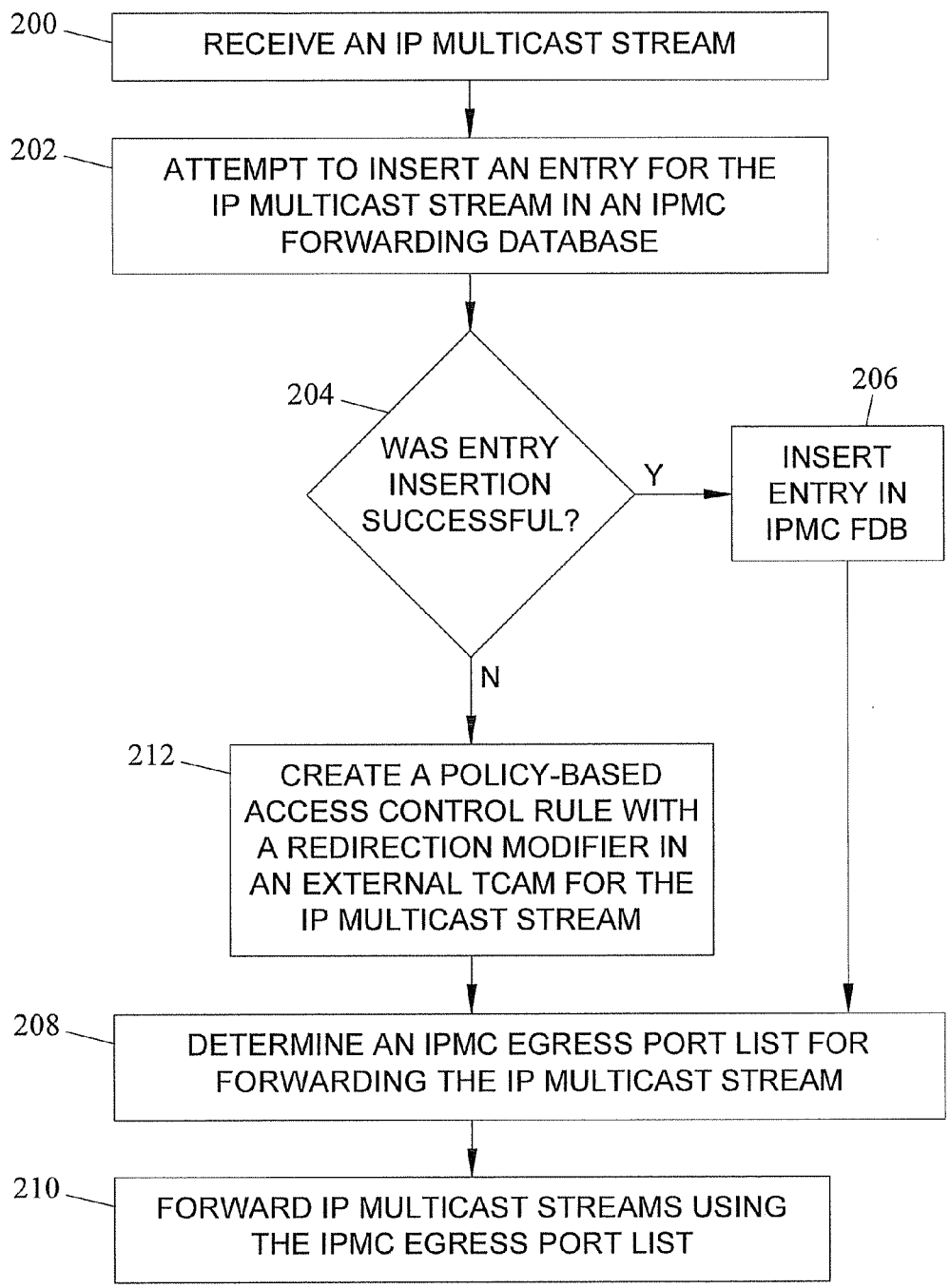
FIG. 2 is a flow chart illustrating exemplary steps for providing improved multicast scaling through policy redirection according to an embodiment of the subject matter described herein.

FIG. 2 is a flow chart illustrating exemplary steps for providing improved multicast scaling through policy redirection according to an embodiment of the subject matter described herein. According to the method, IP multicast forwarding database 112 may be utilized first. When that resource is exceeded, IP multicast PBR access-control rules may be installed in PBR 128 for subsequent IP multicast streams. The PBR access-control rules can be inserted into a large external TCAM which enables large IP multicast scaling capability. Each of these PBR rules then "redirects" the flow to an egress vport (VLAN+port) list 114 which is specified by the normal forwarding rules.

Referring to FIG. 2, at step 200, an IP multicast stream is received. For example, IP multicast stream <sourceIP=10.1.1.1, groupIP=224.1.1.1, VlanId=5> may be received via I/O ports 105 at packet forwarding device 100. At step 202, an attempt is made to create/insert an entry for the IP multicast stream into the IPMC FDB. For example, information extracted from the IP multicast stream may be hashed using a hash function to determine a hash bucket. If there is space available in the hash bucket, then the information is added in IPMC FDB 112 as the next entry in the hash bucket. The hash entry identifier may be independent of the hash value and used simply to indicate the order in which entries are added to each hash bucket. Therefore, if IPMC FDB table 112 includes an 8,000-entry hash table comprised of 1,000 hash buckets of 8 entries each, each hash bucket may include a maximum of eight entries labeled 0-7.

At step 204, it is determined whether the insertion attempt was successful or failed. For example, if it is assumed that hash bucket 7 is not yet full, the insertion attempt would be successful and control may proceed to step 206.

At step 206, the entry may be inserted into the IPMC FDB. Exemplary information that may be added to IPMC FDB 112 may include source IP address, group IP address, and VLAN ID which are associated with an egress port list located in IPMC egress port list table 114.

At step 208, an IPMC port list may be determined/located for the IPMC stream. For example, a lookup may be performed in IPMC FDB 112 to determine an egress port list for the entry.

At step 210, the IP multicast stream may be forwarded using the IPMC egress port list. For example, IP multicast packets may be forwarded to a next hop destination as indicated by the vport(s) listed in IPMC egress port list table 114.

Alternatively, returning to the decision in step 204, if it is determined that IP multicast stream <sourceIP=10.1.1.1, groupIP=224.1.1.1, VlanId=5> cannot be inserted into IPMC DFB 112 because hash bucket 7 is full, control may proceed to step 212 as described below.

At step 212, a policy-based access control rule may be created, where the PBR rule includes a redirection modifier for the IP multicast stream. The redirection modifier points to an entry in the IPMC egress port list which can be used to forward the IPMC stream to its next hop destination.

Figure 3:
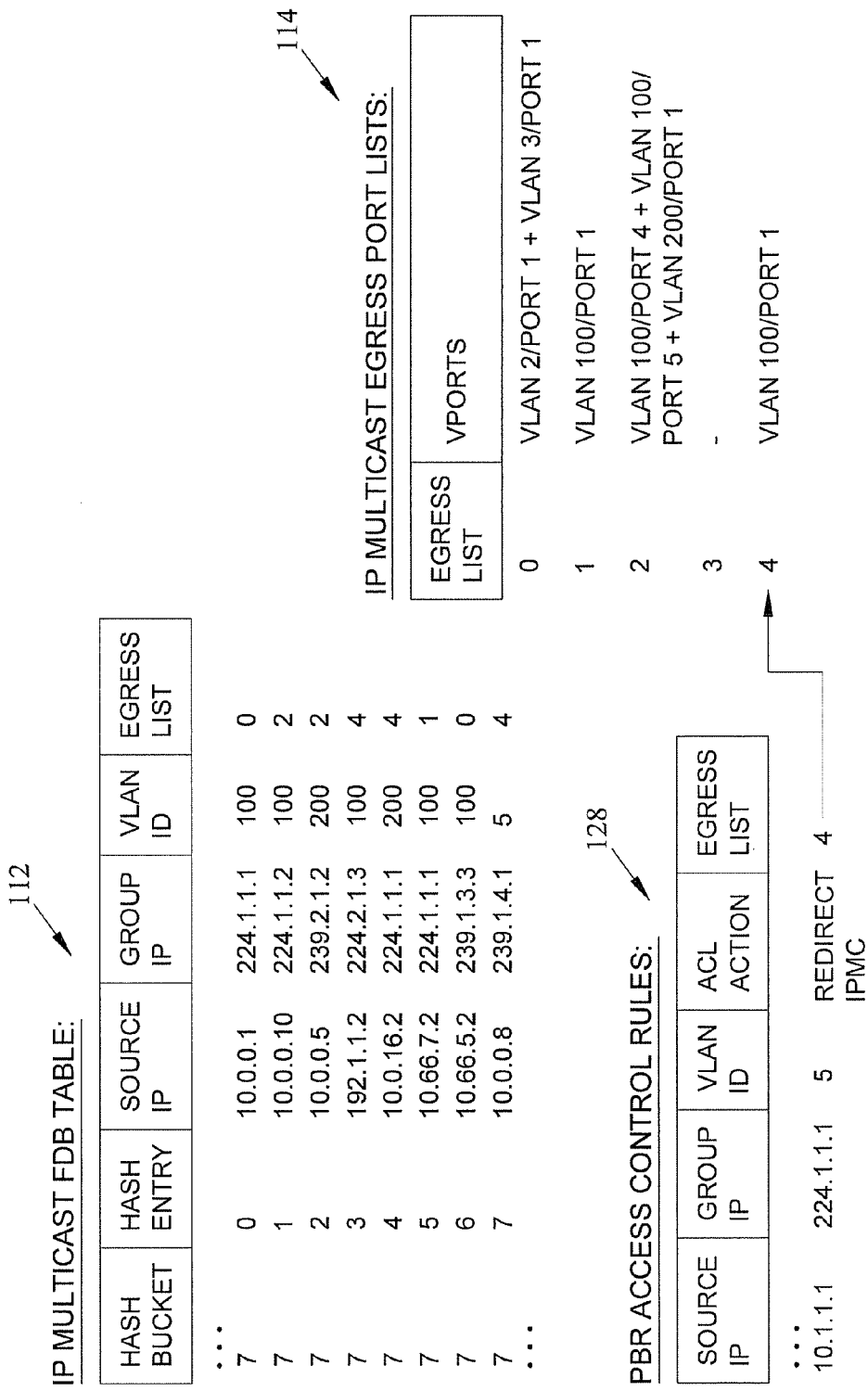
FIG. 3 is a diagram illustrating an exemplary scenario for forwarding a multicast stream using improved multicast scaling through policy redirection according to an embodiment of the subject matter described herein.

FIG. 3 is a diagram illustrating an exemplary scenario for forwarding a multicast stream using improved multicast scaling through policy redirection according to an embodiment of the subject matter described herein. FIG. 3 uses specific data to illustrate the method outlined above with respect to FIG. 2. In this example, hash bucket "7" is full causing a subsequent insertion failure of IP multicast stream <sourceIP=10.1.1.1, groupIP=224.1.1.1, VlanId=5>. Rather than slowpath processing the stream, this stream is instead added to PBR 128 as an access-control rule with a redirection action modifier. The redirection actions can either use an established egress port list (as shown) or allocate a new egress port list. The redirection modifier points to an entry in the IPMC egress port list which can be used to forward the IPMC stream to its next hop destination.

Additionally, it may be appreciated that the subject matter described herein may be used in combination with commonly owned and assigned, co-pending U.S. patent application Ser. No. 12/355,756 entitled, "METHODS, SYSTEMS, AND COMPUTER READABLE MEDIA FOR CONSERVING MULTICAST PORT LIST RESOURCES IN AN IP PACKET FORWARDING DEVICE," which is incorporated by reference herein in its entirety, in order to achieve greater scalability of IPMC forwarding resources. For example, both native IP multicast forwarding database 112 and PBR rules 128 can reference the same set of IP multicast egress port lists when there is common memberships across multiple multicast streams.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for improved multicast scaling through policy-based redirection, the method comprising:
    receiving a packet belonging to an Internet protocol multicast (IPMC) stream, wherein the packet includes packet routing information;
    performing a lookup in an IPMC forwarding database (FDB) and, in response to failing to locate an entry in the IPMC FDB, attempting to insert the packet routing information in the IPMC FDB;
    in response to failing to insert the packet routing information in the IPMC FDB:
        automatically creating a packet redirection rule based on the packet forwarding information; and
        automatically adding the packet redirection rule to a policy-based redirection (PBR) access control rule (ACR) data structure for storing policy-based redirection rules for overriding layer 3 forwarding decisions for specific access controls and instead forwarding packets to an alternate next hop, wherein the packet redirection rule points to an entry in an IMPC egress port list data structure that specifies a port list identifying at least one port to which packets in the IP multicast stream should be forwarded and includes a redirection action for redirecting packets in the IPMC stream to the port list and a multicast group identifier for identifying the packets in the IPMC stream;
    redirecting the IP multicast stream, using the packet redirection rule in the PBR ACR data structure and the entry in the IPMC egress port list data structure and forwarding the IP multicast stream to the at least one port specified by the port list in structure the IPMC egress port list data structure; and
    wherein redirecting the IP multicast stream using the policy based packet redirection rule in the PBR ACR data structure includes performing a lookup in the PBR ACR data structure for packets in the IPMC stream for which entries do not exist in the IPMC FDB in lieu of performing slow path processing for the packets.

2. The method of claim 1 wherein attempting to insert the packet routing information includes performing a hash operation.

3. The method of claim 1 wherein the receiving, performing, and creating are performed at a layer 2 and/or layer 3 packet forwarding device.

4. The method of claim 3 wherein the failing to insert the packet routing information in the IPMC FDB occurs due to lack of available memory for entries in the IPMC FDB.

5. A packet forwarding device for improved multicast scaling through policy-based redirection, the packet forwarding device comprising:
    an input/output (I/O) module for receiving a packet belonging to an Internet protocol multicast (IPMC) stream, wherein the packet includes packet routing information;
    an IPMC egress port data structure for storing vports being indexed by port list identifiers, wherein each vport includes one or more ports and virtual local area network (VLAN) identifiers;
    an IPMC forwarding database (FDB) for storing entries containing packet routing information, wherein each entry is associated with an egress port list in the IPMC egress port data structure;
    a policy-based redirection (PBR) access control rule (ACR) data structure for storing entries containing packet routing information and action modifiers that override the routing decision indicated by the IPMC FDB, wherein each entry is associated with an egress port list in the IPMC egress port data structure; and
    an intelligent IPMC scaling module for:
        performing a lookup in the IPMC FDB and, in response to failing to locate an entry in the IPMC FDB, attempting to insert the packet routing information in the IPMC FDB;
        in response to failing to insert the packet routing information in the IPMC FDB:
            automatically creating a packet redirection rule based on the packet forwarding information; and
            automatically adding the packet redirection rule to a policy-based redirection (PBR) access control rule (ACR) data structure for storing policy-based redirection rules for overriding layer 3 forwarding decisions for specific access controls and instead forwarding packets to an alternate next hop, wherein the packet redirection rule points to an entry in an IMPC egress port list data structure that specifies a port list identifying at least one port to which packets in the IP multicast stream should be forwarded and includes a redirection action for redirecting packets in the IPMC stream to the port list and a multicast group identifier for identifying the packets in the IPMC stream;
        wherein the intelligent IPMC scaling module is configured to redirect the IP multicast stream, using the packet redirection rule and the entry in the IPMC egress port list data structure and forward the IPMC stream to the at least one port specified by the port list in the entry in the IPMC egress port list data structure; and
        wherein the intelligent IPMC scaling module is configured to perform a lookup in the PBR ACR data structure for packets in the IPMC stream for which entries do not exist in the IPMC FDB in lieu of performing slow path processing for the packets.

6. The packet forwarding device of claim 5 wherein the intelligent IPMC scaling module is configured to perform a hash operation.

7. The packet forwarding device of claim 5 wherein the packet forwarding device includes a layer 3 packet forwarding device.

8. The packet forwarding device of claim 7 wherein the failing to insert the packet routing information in the IPMC FDB occurs due to lack of available memory for entries in the IPMC FDB.

9. A non-transitory computer readable medium comprising computer executable instructions embodied in a computer readable medium and when executed by a processor of a computer performs steps comprising:

receiving a packet belonging to an Internet protocol multicast (IPMC) stream, wherein the packet includes packet routing information;

performing a lookup in an IPMC forwarding database (FDB) and, in response to failing to locate an entry in the IPMC FDB, attempting to insert the packet routing information in the IPMC FDB;

in response to failing to insert the packet routing information in the IPMC FDB:

automatically creating a packet redirection rule based on the packet forwarding information;

automatically adding the packet redirection rule to a packet redirection (PBR) access control rule (ACR) data structure for storing policy-based redirection rules for overriding layer 3 forwarding decisions for specific access controls and instead forwarding packets to an alternate next hop, wherein the packet redirection rule points to an entry in an IMPC egress port list data structure that specifies a port list identifying at least one port to which packets in the IP multicast stream should be forwarded and includes a redirection action for redirecting packets in the IPMC stream to the port list and a multicast group identifier for identifying the packets in the IPMC stream;

redirecting the IP multicast stream, using the packet redirection rule in the PBR ACR data structure and the entry in the IPMC egress port list data structure and forwarding the IP multicast stream to the at least one port specified by the port list in the entry in the IPMC egress port list data structure; and redirecting the IP multicast stream using the packet redirection rule in the PBR ACR data structure includes performing a lookup in the PBR ACR data structure for packets in the IPMC stream for which entries do not exist in the IPMC FDB in lieu of performing slow path processing for the packets.

\* \* \* \* \*